US009784761B2

(12) United States Patent
Fiorini et al.

(10) Patent No.: US 9,784,761 B2
(45) Date of Patent: Oct. 10, 2017

(54) ACTIVE PROBE FOR NEAR FIELD OPTICAL MICROSCOPY COMPRISING HYPERPOLARIZABLE MOLECULES ALIGNED AND ORIENTED TO EMIT, UPON ILLUMINATION, A DIFFERENT WAVELENGTH THAN THAT OF ILLUMINATION

(71) Applicant: Commissariat A L'Energie Atomique Et Aux Energies Alternatives, Paris (FR)

(72) Inventors: Céline Fiorini, Orsay (FR); Fabrice Charra, Marcoussis (FR); Ludovic Douillard, Antony (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 335 days.

(21) Appl. No.: 14/377,627

(22) PCT Filed: Feb. 6, 2013

(86) PCT No.: PCT/IB2013/050986
§ 371 (c)(1),
(2) Date: Oct. 19, 2015

(87) PCT Pub. No.: WO2013/121324
PCT Pub. Date: Aug. 22, 2013

(65) Prior Publication Data
US 2016/0077127 A1 Mar. 17, 2016

(30) Foreign Application Priority Data

Feb. 17, 2012 (FR) ..................................... 12 51495

(51) Int. Cl.
G01Q 70/12 (2010.01)
G01Q 60/22 (2010.01)
G01Q 60/20 (2010.01)

(52) U.S. Cl.
CPC ............. *G01Q 60/22* (2013.01); *G01Q 60/20* (2013.01)

(58) Field of Classification Search
CPC ........ G01Q 60/22; G01Q 60/20; G01Q 70/12; G01J 3/447
USPC ........................... 250/201.3–201.5, 306–311
See application file for complete search history.

(56) References Cited

U.S. PATENT DOCUMENTS

| 5,105,305 A | 4/1992 | Betzig et al. |
| 5,627,922 A | 5/1997 | Kopelman et al. |
| 7,341,681 B2 * | 3/2008 | Mitsui ....................... B82B 3/00 216/24 |

OTHER PUBLICATIONS

International Search Report and Written Opinion for Application No. PCT/IB2013/050986 dated Apr. 19, 2013.
(Continued)

*Primary Examiner* — Que T Le
(74) *Attorney, Agent, or Firm* — Alston & Bird LLP

(57) ABSTRACT

The invention relates to an active probe for near-field optical microscopy, characterized in that it includes a metal or metallized tip (PM) at the apex of which a nanoscale body (NB) is located, the body having a polymer matrix capable of, or containing a host (MH) capable of, emitting under illumination, light (SH) at a wavelength different from that of the illumination. A process for manufacturing such a probe is also provided.

16 Claims, 2 Drawing Sheets

(56) References Cited

OTHER PUBLICATIONS

Berline, I. et al., *STM Induced Second Harmonic Generation: Towards Near-Field Nonlinear Optical Microscopy*, Proceedings of SPIE, vol. 6988 (Jan. 2008) pp. 69880M-69880M-6 (XP055029127).

* cited by examiner

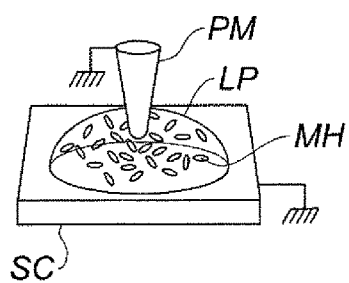
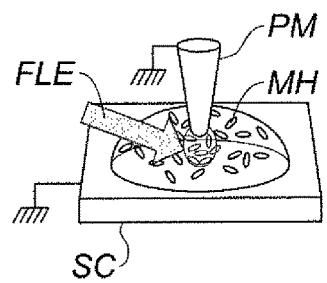
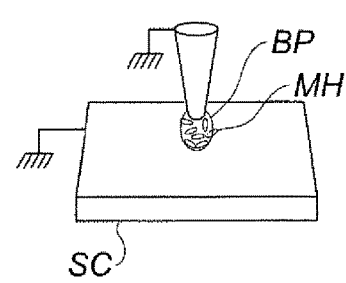
Fig. 3A             Fig. 3B             Fig. 3C
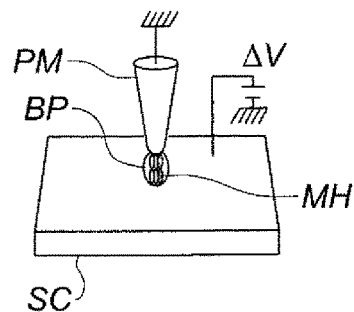
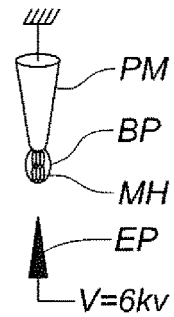
Fig. 3D             Fig. 3D'
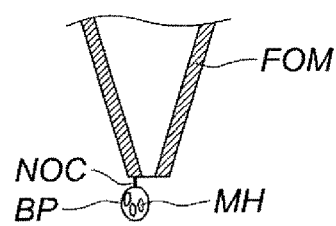
Fig. 4

ACTIVE PROBE FOR NEAR FIELD OPTICAL MICROSCOPY COMPRISING HYPERPOLARIZABLE MOLECULES ALIGNED AND ORIENTED TO EMIT, UPON ILLUMINATION, A DIFFERENT WAVELENGTH THAN THAT OF ILLUMINATION

FIELD

The invention relates to an active probe for near-field optical microscopy and to its method of fabrication, and also to a near-field optical microscope comprising such a probe.

BACKGROUND

Near-field optical microscopy (SNOM or NSOM, for the term "Scanning Near-field Optical Microscopy") is a scanning microscopy technique which enables the limit imposed by diffraction on the resolution of conventional optical microscopy to be overcome. The principle on which this technique is based consists in illuminating a sample and in scanning its surface with a probe of nanometric size (generally a sharp point of a tip). The probe is usable for working in the optical near field, in collection and/or illumination mode, and thus allows an image of the sample to be obtained whose resolution is limited by its dimensions rather than by diffraction.

The probe can be a simple scattering tip, such as a tip of an atomic force or tunneling microscope, whose function is solely to convert the evanescent waves, present near to the sample, into propagating waves which can be detected in far-field mode by a conventional optical system. This is referred to as near-field optical microscopy "without aperture".

As a variant, the probe can have an aperture of nanometric size: this is near-field optical microscopy "with aperture". This nano-aperture can be used to generate evanescent waves that the sample can convert into propagating waves which will subsequently be detected in far-field mode ("illumination mode"), in order to collect evanescent waves generated by the sample illuminated by an external and non-local light source ("collection mode"), or else in order to generate and to collect evanescent waves at the same time ("illumination-collection mode"). The probe with a nano-aperture can be composed of an optical fiber having one drawn out and metalized end.

The conventional techniques of near-field optical microscopy—with or without aperture—do not allow a spatial resolution better than around 30 nm to be obtained. Since the spatial resolution is directly linked to the dimensions of the probe, apertures and/or tips with dimensions smaller than the desired resolution must be used. Although the use of apertures or tips with dimensions less than around 30 nm is technically achievable, in practice, probes of this type would be unusable because they would generate a signal of insufficient intensity with a low signal-to-noise ratio.

The concept of a near-field optical microscopy using an active probe, introduced in the 1990s, aims to provide an improvement in the spatial resolution. Its principle consists in using a secondary light source of nanometric dimensions, emitting directly in the near field of the object to be observed. As a source, a fluorescent nano-object may be used, for example a microcrystal containing a single fluorescent molecule, attached to the end of a scattering tip (J. Michaelis et al. "*Optical microscopy using a single-molecule light source*", Nature, Vol. 405, 18th May 2000, pp. 325-328). In reality, the implementation of this concept proved to be very complex and did not allow resolutions to be obtained that were better than the more conventional techniques using "passive" probes. This is due mainly to the fact that it is difficult to attach and to maintain a nano-light source in a stable manner on a probe, and to accurately position it.

I. Berline et al. have proposed an approach allowing this difficulty to be avoided. As illustrated in FIG. 1, these authors use a metal tip PM immersed in a droplet of liquid L posed on the surface of the sample E to be observed. The liquid is a solution containing 4-di-butyl-amino-4'-nitroazobenzene (DBANA), a molecule with an elongated shape, exhibiting a permanent electric dipole and a high hyperpolarizability β (dielectric susceptibility of the second order at the molecular scale). A potential difference ΔV is applied between the metal tip and the sample; thus an intense static electric field is developed mainly at the apex of the tip and induces a localized alignment and orientation of the molecules. Simultaneously, the assembly formed by the tip and the liquid droplet is illuminated by a pulsed laser beam FL in the near infrared (wavelength $\lambda_1$: 780 nm; duration: 100 fs). In a small volume VS immediately underneath the tip, whose lateral dimensions are of the order of the radius of curvature of the apex of the latter, the molecules of DBANA are oriented and aligned and emit coherent second harmonic radiation SH at a wavelength $\lambda_2=\lambda_1/2=390$ nm. Outside of this volume, the random orientation of the molecules of DBANA only allows the generation of very weak incoherent second harmonic radiation. Thus, the volume VS may be considered as a nano-source for light, emitting radiation at a wavelength different from that of the illuminating laser beam. In contrast to the nano-sources of light used in the previously known active SNOM probes, the volume VS is necessarily positioned exactly in correspondence with the apex of the tip PM; furthermore, no complex attachment operation is required. Moreover, a relatively intense light emission can be obtained starting from a small number of molecules—and hence from a very small volume VS—thanks to the coherent nature of the process of second harmonic generation (a signal that is quadratic with the number of oriented molecules), which is not the case for the nano-sources based on molecular fluorescence.

However, the use of a liquid droplet may be incompatible with certain samples. Furthermore, the refraction within the droplet and the absorption of the light by the liquid complicate both the illumination of the sample and the collection of the second harmonic signal. In order to get round this difficulty, it has been proposed to perform the illumination and the collection via the back face of the sample, for example by means of a transparent prism PR or of a microscope objective lens having a high aperture number. Such a configuration may not always be envisioned, especially where the sample is opaque.

SUMMARY

The invention aims to overcome the aforementioned drawbacks of the prior art.

One subject of the invention, enabling this objective to be achieved, is an active probe for near-field optical microscopy, characterized in that it comprises a metal or metalized tip at the apex of which is located a block of nanometric dimensions comprising a polymer matrix capable of, or containing a host that is capable of, emitting, under illumination, light radiation of a different wavelength than that of the illumination.

One advantage of such an active probe is that the block of nanometric dimensions, which serves as a nano-light source, can be fabricated directly in situ by local photo-polymerization or photo-reticulation of a precursor, by virtue of an effect of enhancement of the optical field which occurs near to a conducting tip under illumination. The difficulties associated with the mounting and/or with the localization of the nano-source are therefore avoided.

According to various embodiments of the invention:

Said host can comprise hyperpolarizable molecules that are aligned and oriented, as a consequence of which said block of nanometric dimensions is capable of emitting second harmonic radiation. In particular, said hyperpolarizable molecules can be dipolar molecules of the donor-acceptor type, aligned and oriented in an axial direction of said tip. The advantages of the aforementioned method developed by I. Berline and co-workers are thus obtained, without the drawbacks associated with the necessity of operating by immersion in a liquid.

As a variant, said host can comprise fluorescent atoms, molecules or nano-objects.

Said polymer can be a photo-polymer.

The probe can be of the type without aperture.

Said block of nanometric dimensions can comprise a plasmonic nano-object entirely or partially covered by said polymer matrix. This embodiment notably allows a tip formed by the drawn out and metalized end of an optical fiber to be used, as a consequence of which said probe can be of the type with aperture. However, the fabrication of such a probe is more difficult, because the plasmonic nano-object has to be attached or formed on the end of the tip; however, even in this case, the polymer matrix can be fabricated in situ by local photo-polymerization or photo-reticulation of a precursor.

The term "plasmonic nano-object" is understood to mean any object exhibiting details with dimensions less than the order of a micrometer and capable of supporting at least one plasmonic mode. This can notably be a metal nanoparticle, a nano-aperture or a structuring at the nanometer scale of a metal layer coating said optical fiber.

Another subject of the invention is a near-field optical microscope comprising:

an active probe such as described hereinabove;
means of illumination, for illuminating said block of nanometric dimensions with light radiation at a first wavelength; and
a light detector, for detecting light radiation at a second wavelength, different from said first wavelength, emitted by said block of nanometric dimensions and having interacted with said tip and a sample disposed near to the latter.

Yet another subject of the invention is a method for fabricating an active probe for near-field optical microscopy, comprising the steps consisting in:

disposing a metal or metalized tip in contact with a medium which can undergo a chemical modification that is activated optically, either directly or indirectly, and which comprises a component capable of emitting, when it is illuminated, light radiation with a wavelength different from that of the illumination; and
illuminating said tip with light radiation whose electric field has a component parallel to the axis of the tip and whose intensity is insufficient for directly activating said chemical modification, but sufficient for locally inducing a said chemical modification via a field enhancement by a tip effect or an emission of electrons by the apex of said tip;
said chemical modification leading to the formation of a solid block of nanometric dimensions covering, at least partially, the apex of said tip.

According to various embodiments:

Said medium can comprise a photo-polymerizable and/or photo-reticulable liquid.
Said medium can comprise hyperpolarizable molecules, the method also comprising a step for applying an electric field between said tip and an electrode for aligning and orienting said molecules.
Said electrode can be a substrate on which said medium is deposited.
Said step for applying an electric field can be implemented during the step consisting in illuminating said tip so as to cause a local chemical modification of said medium. As a variant, it can be implemented after the step consisting in illuminating said tip.
As a variant, said medium can comprise fluorescent atoms, molecules or nano-objects.

A further subject of the invention is a method for fabricating an active probe for near-field optical microscopy, comprising the steps consisting in:

attaching or forming a plasmonic nano-object at the end of a metal or metalized tip;
disposing the end of said tip, with said plasmonic nano-object, in contact with a medium which can undergo a chemical modification that is activated optically, either directly or indirectly, and which comprises a component capable of emitting, when it is illuminated, light radiation with a wavelength different from that of the illumination; and
exciting a plasmonic mode of the plasmonic nano-object, in such a manner as to locally induce a said chemical modification of said medium, as a consequence of which a solid block of nanometric dimensions is obtained covering, at least partially, said plasmonic nano-object.

Notably, said tip can be formed by the drawn out and metalized end of an optical fiber.

BRIEF DESCRIPTION OF THE DRAWINGS

Other features, details and advantages of the invention will become apparent from reading the description presented with reference to the appended drawings given by way of example, in which:

FIGS. 3A-3D illustrate an alternative method for fabricating an active probe of the type "without aperture" according to one embodiment of the invention;

FIG. 3D' illustrates one variant of the step shown by FIG. 3D; and

FIG. 4 shows an active probe of the type "with aperture" according to another embodiment of the invention.

DETAILED DESCRIPTION

The active probe SA of the type without aperture is essentially composed of a metal (or metalized) tip PM at the apex of which is located a polymer block or "lug" BP of nanometric dimensions, forming a nano-light source.

An object is considered as having nanometric dimensions or, in an equivalent manner, as being a "nano-object" when at least two of its three main dimensions—height, length, width—are less than or equal to 100 nm.

The tip PM can be a tip of a tunneling electron microscope or of an atomic force microscope. Its fabrication is conventional. Advantageously, its apex has a radius of curvature less than 100 nm, preferably of the order of 10 nm, or even smaller.

Figure 1:
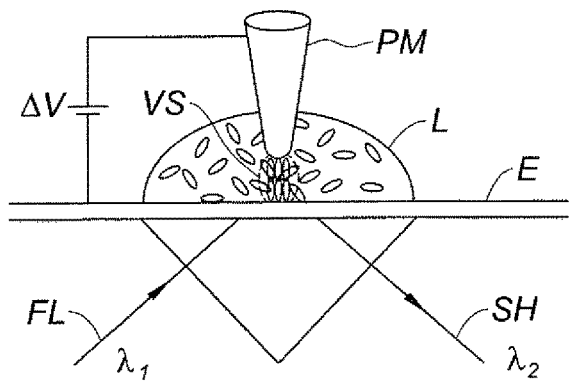
FIG. 1 illustrates a prior art approach of near-field optical microscopy.
Figure 2A:
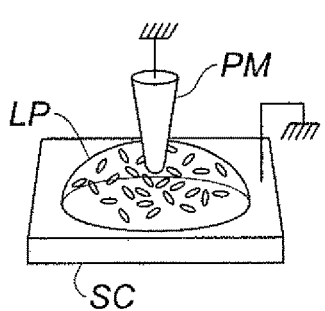
FIGS. 2A-2C illustrate a method for fabricating an active probe of the type "without aperture" according to one embodiment of the invention.

As illustrated in FIG. 2A, the first step in a fabrication method according to the invention consists in immersing the tip PM in a droplet of a photo-polymerizable liquid LP, deposited on a conducting substrate SC, held initially at the same potential as the tip. The tip is disposed at a predefined distance from the substrate, generally in the range between 1 and around 100 nm.

The photo-polymerizable liquid can, in particular, comprise four components: a photo-sensitizing dye, a co-synergist, a monomer and a hyperpolarizable component exhibiting a permanent electric dipole. The first three components are designed to form a solid polymer matrix after photo-polymerization; on the other hand, the hyperpolarizable component is designed to form a light-emitting host.

For example, the photo-sensitizing dye can be eosin Y (disodium 2',4',5',7'-tetrabromofluorescein) exhibiting an absorption band at 450-550 nm, at a concentration of 0.5% by weight; the co-synergist, an amine such as methyldiethanolamine (MDEA) at a concentration of 4% by weight and the monomer pentaerythritol triacrylate (PETIA). The hyperpolarizable component can be 4-di-butyl-amino-4'-nitroazobenzene (DBANA), as in the aforementioned works by I. Berline et al., or more generally, any other molecule of the "uniaxial push-pull" type, comprising two electronically conjugate parts, one of which is an electron donor and the other an electron attractor.

Figure 2B:
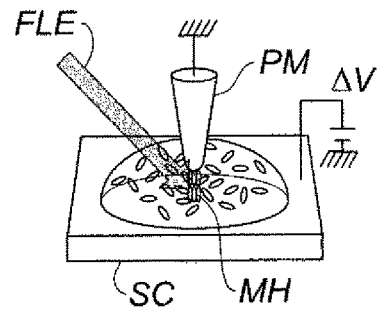

Subsequently (FIG. 2B), a potential difference $\Delta V$ is applied between the tip and the conducting substrate. The value of this potential difference is chosen such that the electric field near to the apex of the tip is around 50-100 V/µm. The effect of this electric field is to axially align and to orient the hyperpolarizable molecules, identified by the reference MH in the figure.

Simultaneously, the tip-liquid assembly is illuminated by an illuminating light beam FLE having a wavelength close to the absorption maximum of the photo-sensitizing dye (532 nm for eosin). The intensity of the beam is chosen in such a manner as to be below the activation threshold of the chemical modification of the liquid in the absence of any phenomenon of local enhancement of the electromagnetic field.

The beam FLE is polarized, and its electric field vector has a component oriented along the axis of the tip PM. This can be obtained by using a grazing incidence and a polarization p or by using a normal incidence for a highly-focused beam having a radial polarization. Under these conditions, a local enhancement of the electromagnetic field occurs in the immediate vicinity of the apex of the tip, with an amplification of the light intensity that can reach a factor of 3000 over a distance of a few nanometers. This enhancement induces a local photo-polymerization of the liquid, and hence the formation of a solid polymer block BP with nanometric dimensions, which adheres to the apex of the tip. The adhesion may be facilitated by a suitable treatment of the surface of the tip, for example a functionalization. By way of example, it is known that thiol-containing compounds can be chemisorbed onto metals such as gold and silver. Thus, a functionalization adapted to the desired goal can be obtained by depositing a monolayer, auto-assembled by dip-coating, of thiols having substituents, such as acids or amines, capable of interacting electrostatically with constituents of the polymer. Amongst the thiols that may be used to produce such a functionalization may be mentioned, solely by way of example, 11-mercaptoundecanoic acid, 4-mercaptobenzoic acid and 6-amino-1-hexanhethiol hydrochloride.

The spatial extent of the polymer block is directly linked to the characteristics of the tip (radius of curvature, nature of the metal), to the tip-substrate distance, to the duration of the illumination and to the intensity of the illuminating beam. The block BP can have an approximately spherical shape, with a radius of 10 nm and, consequently, a volume of 4200 $nm^3$. Assuming a concentration at $10^{-2}M$ of DBANA, the block contains around 25 hyperpolarizable molecules. Although this number is very low, it is nevertheless sufficient to obtain a detectable second harmonic signal owing to the coherent nature of the generation process and by taking advantage of the local enhancement effects of the tip (optical antenna effect).

The effect of enhancement of the electromagnetic field by a conducting tip has been studied by L. Novotny et al. in the article "Theory of Nanometric Optical Tweezers", Phys. Rev. Lett. 79, 4, pp. 645-648 (1997).

It should be noted that the enhancement of the field by a conducting tip is a non-resonant effect: the wavelength of illumination can therefore be adapted to the photo-polymerizable liquid, without being constrained by the geometry or the material of the tip.

Figure 2C:
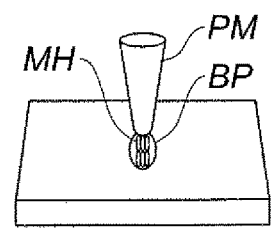

Once the photo-polymerization step has been carried out, the electric field and the illumination are turned off and the non-photo-polymerized liquid is rinsed off (FIG. 2C).

Figure 2D:
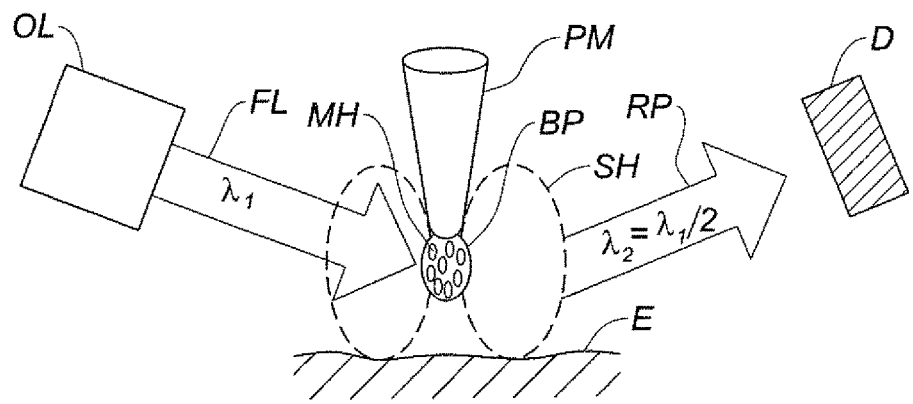
FIG. 2D illustrates the use of such an active probe.

FIG. 2D—which is not to scale—illustrates a mode of use of the active probe thus fabricated in a near-field optical microscopy without aperture. An laser oscillator OL emits a laser beam FL, preferably pulsed, at a wavelength $\lambda_1$ which is focused onto the tip, preferably with a resultant polarization having a component of the electric field parallel to the axis of the tip, and hence to the main axis of the hyperpolarizable molecules. The non-linear response of these molecules—maximized by this choice of the polarization—leads to the emission of a second harmonic radiation SH: the polymer block therefore behaves exactly like a nano-light source at the wavelength $\lambda_2=\lambda_1/2$. Given that this source has much smaller dimensions than the wavelength, its emission diagram, shown with dashed lines, is approximately that of a dipole, the presence of the tip being however able to modify this diagram accordingly. The radiation SH interacts in near-field mode with the sample E and the tip PM; this interaction produces propagating radiation RP at the wavelength $\lambda_2$ which is detected by the sensor D, according to the principles of active-probe near-field optical microscopy without aperture.

As a variant, the emission of the active probe can be excited by illuminating it from below by means of a widely open microscope objective lens and of a radial incident polarization. It is also possible to localize an excitation at the end of the tip by propagation of plasmons along the tip and effects referred to as "nanofocusing" described in the article by C. Neacsu et al. "Near-Field Localization in Plasmonic Superfocusing: A Nanoemitter on a Tip", Nanoletters, 10, 592 (2010).

The second harmonic generation is a non-resonant process. As a consequence, the choice of the wavelength $\lambda_1$ is relatively free, depending on the application being considered. For example, it can be advantageous to use a Ti:sapphire laser emitting femtosecond pulses for example at a wavelength $\lambda_1=780$ nm, which gives $\lambda_2=390$ nm.

The application of a high electric field may, in certain cases, initiate undesirable electrochemical reactions in the photo-polymerizable liquid. For this reason, it may be convenient to make use of an alternative two-stage method, illustrated by FIGS. 3A-3D, in which the electric field for aligning and orienting the molecules is only applied after the photo-polymerization step. According to one variant, illustrated by FIG. 3D', the orientation of the hyperpolarizable molecules may be carried out by a corona effect. The tip PM is disposed opposite an electrode in the form of a tip EP and a large potential difference (1 keV or more, for example 6 keV) is applied between the two tips. The ionization of the ambient air which results from this leads to the deposition of ions on the surface of the polymer block, and hence to the appearance of an electric field inside of the latter. The block is heated, generally to a temperature close to the vitreous transition temperature of the matrix, in order to increase the mobility of the molecules which can orient themselves, then cooled while at the same time maintaining the voltage in such a manner as to "freeze" the orientation obtained.

FIG. 4 illustrates an active probe of the type with an aperture, in which the metal tip is in fact a drawn out and metalized optical fiber FOM, at the end of which a conducting plasmonic nano-object NOC (metal nanoparticle) has been attached. The excitation of a surface plasmonic mode of this nano-object playing the role of an antenna leads to a local field enhancement which allows the formation of a polymer block BP by local photo-polymerization, as explained in the article by C. Deeb et al., "Quantitative Analysis of Localized Surface Plasmons Based on Molecular Probing", ACS Nano 4(8), 4579 (2010). In contrast to the tip-effect field enhancement, the excitation of a plasmonic mode is a resonant process; consequently, the wavelength of the illuminating radiation FLE cannot be chosen freely. Furthermore, the fabrication of this active probe requires the attachment of the nano-object NOC to the fiber FOM, which may be difficult.

Several variants may be envisioned without straying from the scope of the invention.

For example, fluorescent molecules may be used as a replacement for the hyperpolarizable molecules considered up to now. In this case, it may be necessary to include a step for bleaching of the photo-sensitizing dye, in particular if the latter has an absorption within the emission band of the fluorophores in question. This embodiment seems less advantageous, in particular since the proximity of the metal tip can induce an extinction ("quenching") of the fluorescence. On the other hand, it can be advantageous to use dual-photon excitable fluorophores, because in this case it is easier to spectrally separate the excitation and the emission. Moreover, as the emission then varies quadratically with the incident intensity, the localization of the emission is improved.

Photosensitizers other than eosin Y can be used; for example, the methylene blue allows a red illuminating beam FLE to be used.

Other compositions of precursors exploiting various mechanisms for chemical modification of the medium may be used. By way of non-limiting examples, aside from the direct photo-polymerization of monomers, potentially in the presence of a photosensitizer (case considered up to now), the following may be envisioned:

the use of hybrid sol-gel materials, for example siloxanes obtained starting from the precursor methacryloxypropyltrimethoxysilane;

the use of photo-reticulatable polymers and photoresists which become insoluble after reticulation induced by the illumination. This is notably the case for photolithography resists (referred to as "positive resists") such as the SU8 photoresist. The difference with respect to the other cases considered here is that the initial medium is not liquid but solid.

The chemical modification can be carried out by multi-photon absorption, or even indirectly by the effect of the electrons locally photo-emitted by the metal tip; on this subject, see the article by K. Iwami et al. "Electron field emission from a gold tip under laser irradiation at the plasmon-resonant wavelength", J. Vac. Sci. Technol. B 29(2), 2011. These variants allow the use of a photosensitizer to be avoided.

The photo-polymerization of diacetylene derivatives in order to form fluorescent polydiacetylenes such as described in the article by A. Sakamoto et al. "Nanoscale Two-Photon Induced Polymerization of Diacetylene Langmuir-Blodgett Film by Near-Field Photoirradiation", J. Phys. Chem. C2011, 115, 6190-6194.

In the case of the embodiment in FIG. 4, it is possible for the plasmonic nano-object not to be a metal nanoparticle but, for example, a nano-aperture or else a structuring at the nanometric scale of the metal layer coating said optical fiber.

The embodiment in FIG. 4 may be generalized to the case where the tip is not formed by the drawn out and metalized end of an optical fiber, but is a simple metal or metalized tip without aperture. In this case, a plasmon resonance and a tip-effect field enhancement are cumulatively obtained.

The invention claimed is:

1. An active probe for near-field optical microscopy, comprising a metal or metalized tip at the apex of which is located a block of nanometric dimensions comprising a polymer matrix containing a host capable of emitting, under illumination, light radiation with a wavelength different from that of the illumination, characterized in that said host comprises hyperpolarizable molecules that are aligned and oriented, as a consequence of which said block of nanometric dimensions is capable of emitting second harmonic radiation.

2. The active probe for near-field optical microscopy as claimed in claim 1, in which said hyperpolarizable molecules are dipolar molecules of the donor-acceptor type, aligned and oriented in an axial direction of said tip.

3. The active probe for near-field optical microscopy as claimed in claim 1, in which said polymer is a photo-polymer.

4. The active probe for near-field optical microscopy as claimed in claim 1, of the type without aperture.

5. The active probe for near-field optical microscopy as claimed in claim 1, in which said block of nanometric dimensions comprises a plasmonic nano-object entirely or partially covered by said polymer matrix.

6. The active probe for near-field optical microscopy as claimed in claim 1, wherein said block of nanometric dimensions comprises a plasmonic nano-object entirely or partially covered by said polymer matrix, and in which said tip is formed by the drawn out and metalized end of an optical fiber, as a consequence of which said probe is of the type with aperture.

7. A near-field optical microscope comprising:
an active probe as claimed in claim 1;
an illumination member for illuminating said block of nanometric dimensions with light radiation at a first wavelength; and
a light detector, for detecting light radiation at a second wavelength, different from said first wavelength, emitted by said block of nanometric dimensions and having interacted with said tip and a sample disposed near to the latter.

8. A method for fabricating an active probe for near-field optical microscopy, comprising the steps:
disposing a metal or metalized tip in contact with a medium which can undergo a chemical modification that is activated optically, either directly or indirectly, and which comprises a component capable of emitting, when it is illuminated, light radiation with a wavelength different from that of the illumination; and
illuminating said tip with light radiation whose electric field has a component parallel to the axis of the tip and whose intensity is insufficient for directly activating said chemical modification, but sufficient for locally inducing a said chemical modification via a field enhancement by a tip effect or an emission of electrons by the apex of said tip;
said chemical modification leading to the formation of a solid block of nanometric dimensions covering, at least partially, the apex of said tip.

9. The method as claimed in claim 8, in which said medium comprises a photo-polymerizable and/or photo-reticulable liquid.

10. The method as claimed in claim 8, in which said medium comprises hyperpolarizable molecules, the method also comprising a step for applying an electric field between said tip and an electrode for aligning and orienting said molecules.

11. The method as claimed in claim 10, in which said electrode is a substrate on which said medium is deposited.

12. The method as claimed in claim 10, in which said step for applying an electric field is implemented during the step consisting in illuminating said tip so as to cause a local chemical modification of said medium.

13. The method as claimed in claim 10, in which said step for applying an electric field is implemented after the step consisting in illuminating said tip so as to cause a local chemical modification of said medium.

14. The method as claimed in claim 10, in which said medium comprises fluorescent atoms, molecules or nano-objects.

15. The method as claimed in claim 8, comprising the steps consisting in:
attaching or forming a plasmonic nano-object at the end of a metal or metalized tip;
disposing the end of said tip, with said plasmonic nano-object, in contact with a medium which can undergo a chemical modification that is activated optically, either directly or indirectly, and which comprises a component capable of emitting, when it is illuminated, light radiation with a wavelength different from that of the illumination; and
exciting a plasmonic mode of the plasmonic nano-object, in such a manner as to locally induce a said chemical modification of said medium, as a consequence of which a solid block of nanometric dimensions is obtained covering, at least partially, said plasmonic nano-object.

16. The method as claimed in claim 15, in which said tip is formed by the drawn out and metalized end of an optical fiber.

* * * * *